W. W. LAMBERTON & D. R. LEMMAN.
Car-Starters.

No. 135,564. Patented Feb. 4, 1873.

Witnesses.
Inventors.

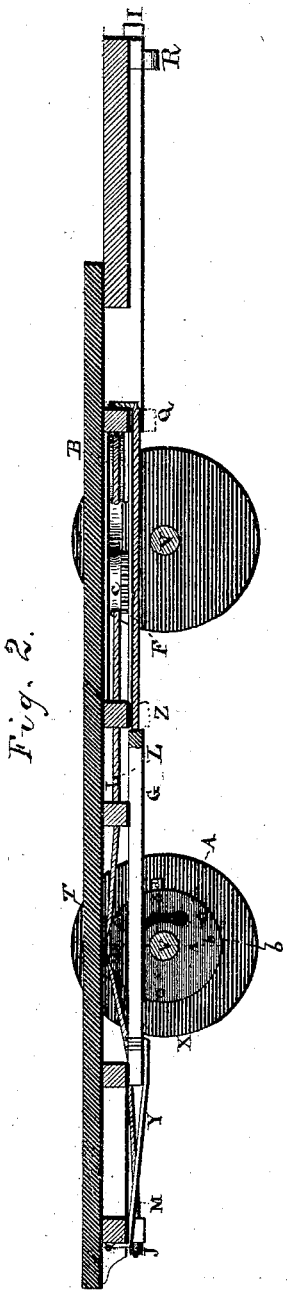

3 Sheets--Sheet 3.

W. W. LAMBERTON & D. R. LEMMAN.
Car-Starters.

No. 135,564. Patented Feb. 4, 1873.

Witnesses  Inventors

UNITED STATES PATENT OFFICE.

WILLIAM W. LAMBERTON AND DANIEL R. LEMMAN, OF NEW ORLEANS, LA.

IMPROVEMENT IN CAR-STARTERS.

Specification forming part of Letters Patent No. 135,564, dated February 4, 1873.

*To all whom it may concern:*

Be it known that we, WILLIAM W. LAMBERTON and DANIEL R. LEMMAN, of the city of New Orleans, parish of Orleans and State of Louisiana, have invented certain improvements in the method and principle of transmitting power from the motor to cars, street-cars, or other wheeled vehicles, of which the following is a specification:

The object of our invention is to assist the motor in starting vehicles from a state of rest by utilizing the power applied in such a manner as to overcome the inertia gradually, using the greatest amount of power where the inertia is greatest, the effect being that the motor gains upon the vehicle at starting, and then by means of our invention the vehicle gains on the motor until the distance lost is regained, when their speed is equal.

The means for accomplishing the foregoing consists of an apparatus hereinafter described and illustrated by accompanying drawing representing our invention as applied to the ordinary street-car, to which it is adapted, and to which it can be readily attached without any material alteration in the latter.

Figure 1:
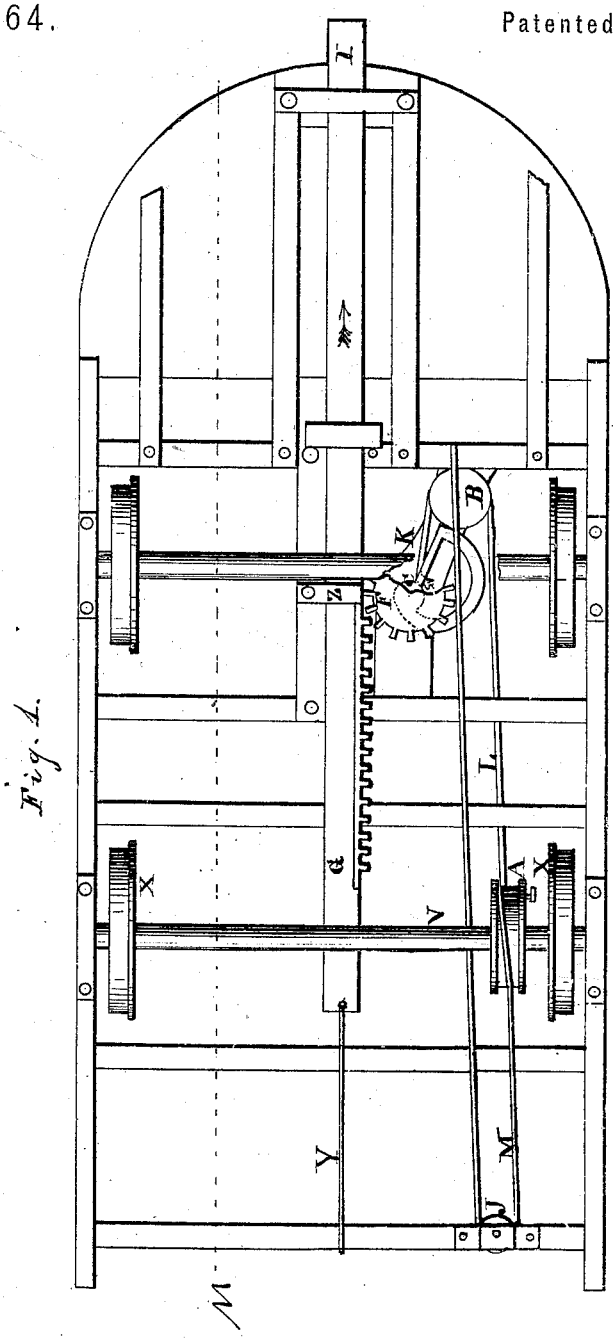

Figure 1 is a perspective view of our invention as attached to the ordinary street-car. Fig. 2 is a sectional side view of the same cut through the dotted line W; also part of the central portion of rack-bar G I broken out to show other parts. Figs. 3, 4, 5, and 6 are details of the foregoing—

Like letters referring to like parts in the drawing.

A is a drum, loose on the axle V. A contains within it the ratchet-wheel U, said ratchet-wheel being rigid on the axle V, and may revolve independently of drum A. A is provided with pawls P P, by means of which it can be made rigid with U, and transmit motion through axle V to wheels X X. Said pawls are provided with springs $n$, spurs $ff$, pivots $e\,e$, and lifter S with arm $d$ for the purpose of pawling and unpawling. A has also on its periphery flanges for chains, cords, or belts, to wind upon. Two chains (or cords) are attached to drum A. One is wound once around and the other partially around it, and leading off in opposite directions—chain or cord M leading to and attaching to pulley J, and the chain L passing around the guide-sheave B and attaching to the expanding drum C at its smallest diameter, as shown in Fig. 1. C is a drum, made in the form of a scroll, as shown in Fig. 1, and is fixed on a vertical axle (or shaft) with the spur-wheel F, said shaft being held by bearings attached to frame K, which, in turn, is attached to the frame or bottom of the car. G I is a rack-bar, which is provided with a rack of teeth, into which the spur-wheel F meshes. Said rack-bar is supported in position by guides or rollers Z Q R attached to the bottom of the car-frame; Z and Q also act as stops to prevent the rack-bar from traveling beyond the desired distance by means of the lugs O N. Y is a gum (or other) spring attached to the rear end of the rack-bar by one end, and by the other end fastened to the car-frame. X X are car-wheels, and V the axle. T, Fig. 2, is a bracket attached to the car-floor for the purpose of giving motion to the lifter to trip the pawls at the proper time. $d$ in Fig. 2 is the crank-arm of the lifter S, by which it receives motion.

Figure 5:
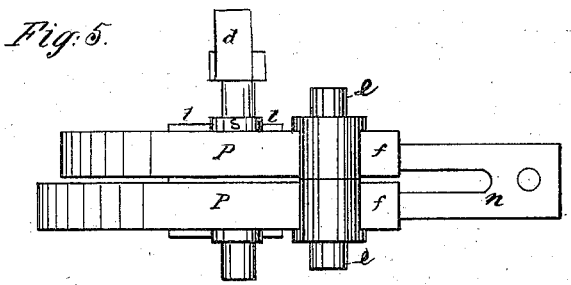
Figure 4:
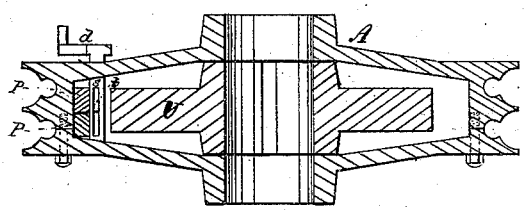
Figure 6:
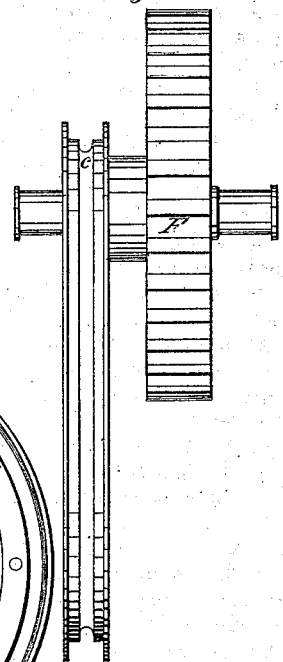
Figure 3:
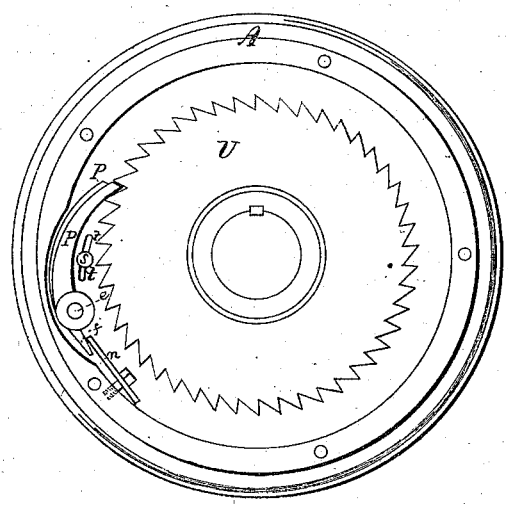

Fig. 3 is a sectional view of A in Fig. 1 cut at right angles to axle V, showing ratchet-wheel U, pawls P P with their pivots $e\,e$, spurs $f\,f$, and springs $n$, lifter S with its toes $t\,t$. Fig. 4 is a sectional view of the same cut through the dotted line $b$ in Fig. 2, showing, in addition to Fig. 3, the crank-arm $d$ of lifter S. Fig. 5 is a top view, on a large scale, of pawls, springs, and lifter in their relative positions. Fig. 6 is a side view of expanding drum C and wheel F in their positions relative to each other on their shaft (or axle.)

The manner in which our invention operates is as follows, speaking of it as applied to a street-car: The animal being hitched to the rack-bar at I draws the bar forward in the direction from G toward I, thereby giving motion to the wheel F and to drum C, winding chain L on C, thereby turning drum A, unwinding L from A, and winding M upon A, and stretching springs J and Y. Coincident with the first movement of drum A the lifter-arm $d$ is released from bracket T, and a pawl, by means of its spring, is forced onto the ratchet-wheel U, making the latter rigid with A, thereby communicating motion to the wheels X X by means of their axle V, thereby giving forward motion to the car. When the rack-bar has reached its forward maximum point, its motion is arrested by the lug N striking the guide Q; meanwhile the drum A has revolved far enough to bring the lifter-arm $d$ again in contact with bracket T, causing the lifter S to vibrate and free the pawls from the ratchet-wheel to prevent rattling as it runs by the pawls. When the lug N rests against stop Q the car depends directly on the animal for motion as in ordinary cases, where no such device is used. Should the car, by reason of descending, or other cause, move faster than the animal and cause the draft to relax, the rack-bar immediately recedes, and the apparatus is again ready to help at the first resistance the car meets with. When the car is stopped the animal naturally yields to the gentle draft of the springs which revolve the apparatus backward until the lug O rests against stop Z, at which time the lifter-arm $d$ again comes against the forward side of bracket T, again lifting the pawls, so as to allow the car to be backed should the latter operation be desired. The apparatus is also in position to help start the car ahead, as at first.

Having thus described our invention, what we claim as new, and desire to secure by Letters Patent, is—

1. The combination of the expanding-drum C, wheel F, rack-bar G, and spring Y, substantially as specified.

2. The rack-bar G, expanding-drum C, wheel F, rope or chain L, and case A, substantially as set forth.

WILLIAM W. LAMBERTON.
   DANIEL R. LEMMAN.

Witnesses:
 WM. H. SEYMOUR,
 A. WILSON STARBUCK.